United States Patent
Dumais et al.

(10) Patent No.: US 9,684,131 B2
(45) Date of Patent: Jun. 20, 2017

(54) APPARATUS AND METHOD FOR AN OPTICAL SWITCH HAVING A 2×1 MULTI-MODE INTERFEROMETER AND PHOTODETECTOR

(71) Applicant: Huawei Technologies Co., Ltd., Shenzhen (CN)

(72) Inventors: Patrick Dumais, Ottawa (CA); Eric Bernier, Ottawa (CA)

(73) Assignee: HUAWEI TECHNOLOGIES., LTD., Shenzhen (CN)

( * ) Notice: Subject to any disclaimer, the term of this patent is extended or adjusted under 35 U.S.C. 154(b) by 100 days.

(21) Appl. No.: 14/245,481

(22) Filed: Apr. 4, 2014

(65) Prior Publication Data
US 2015/0286005 A1    Oct. 8, 2015

(51) Int. Cl.
*G02B 6/12*    (2006.01)
*G02B 6/28*    (2006.01)
(Continued)

(52) U.S. Cl.
CPC ......... *G02B 6/29344* (2013.01); *G02B 6/125* (2013.01); *G02B 6/2813* (2013.01); *G02B 6/4215* (2013.01); *G02F 1/3136* (2013.01)

(58) Field of Classification Search
CPC ... G02B 6/29344; G02B 6/125; G02B 6/4215
(Continued)

(56) References Cited

U.S. PATENT DOCUMENTS

| 4,491,413 A | * | 1/1985 | Rashleigh | G01C 19/725 356/460 |
| 4,756,627 A | * | 7/1988 | Nelson | G01K 5/52 374/159 |

(Continued)

FOREIGN PATENT DOCUMENTS

| CN | 200947603 Y | 9/2007 |
| CN | 102354022 A | 2/2012 |

(Continued)

OTHER PUBLICATIONS

Wang, K., et al.,"Active-Passive 4×4 SOA-Based Switch with Integrated Power Monitoring," Optical Fiber Communication Conference and Exposition (OFC/NFOEC), 2012 and the National Fiber Optic Engineers Conference Conference, Mar. 4-8, 2012, pp. 1-3.

(Continued)

*Primary Examiner* — Akm Enayet Ullah
(74) *Attorney, Agent, or Firm* — Slater Matsil, LLP

(57) ABSTRACT

Embodiments are provided for an improved 2×1 switch cell design with integrated photodiode for off-state monitoring. In an embodiment, am optical switch comprises a 2×1 multi-mode interferometer (MMI) coupler including two input waveguides jointly coupled to an output waveguide, and a photodetector coupled to an edge of a first waveguide of the input waveguides, and positioned next to a side of the output waveguide. In another embodiment, an optical chip comprises two input waveguides parallel to each other, and an output waveguide coupled to the two input waveguides. The optical chip further includes a photodetector coupled to (Continued)

a first waveguide of the two input waveguides, and positioned next to the output waveguide, and a branch waveguide extending from the first waveguide into the photodetector.

20 Claims, 10 Drawing Sheets

(51) Int. Cl.
*G02F 1/31* (2006.01)
*G02B 6/293* (2006.01)
*G02B 6/42* (2006.01)
*G02B 6/125* (2006.01)
*G02F 1/313* (2006.01)

(58) Field of Classification Search
USPC .. 385/14–24, 39, 40, 41, 42, 45, 46, 48, 49, 385/50; 355/77; 356/460, 477; 398/188, 398/200, 214; 250/227, 227.28
See application file for complete search history.

(56) References Cited

U.S. PATENT DOCUMENTS

| 5,502,781 | A | * | 3/1996 | Li | G01R 33/0327 385/132 |
|---|---|---|---|---|---|
| 5,566,263 | A | | 10/1996 | Smith et al. | |
| 5,689,597 | A | | 11/1997 | Besse | |
| 5,892,864 | A | * | 4/1999 | Stoll | G02F 1/313 385/17 |
| 6,493,478 | B1 | * | 12/2002 | DeRosa | G02F 1/061 385/14 |
| 6,650,458 | B1 | * | 11/2003 | Prosyk | G02F 1/225 359/237 |
| 6,845,197 | B2 | * | 1/2005 | Lam | G02B 6/125 385/45 |
| 7,027,673 | B1 | * | 4/2006 | Gunn, III | G02B 6/105 385/11 |
| 7,257,296 | B2 | * | 8/2007 | Kim | G02B 6/12004 385/28 |
| 8,676,009 | B2 | * | 3/2014 | Weimann | G02B 6/122 385/46 |
| 8,743,371 | B2 | * | 6/2014 | Langley | G02F 1/225 356/477 |
| 9,164,237 | B2 | * | 10/2015 | Onishi | G02B 6/262 |
| 2003/0007719 | A1 | * | 1/2003 | Forrest | B82Y 20/00 385/14 |
| 2003/0152324 | A1 | | 8/2003 | Betty et al. | |
| 2003/0194824 | A1 | | 10/2003 | Hunt | |
| 2005/0185879 | A1 | * | 8/2005 | Dawes | G01C 19/721 385/14 |
| 2010/0086256 | A1 | | 4/2010 | Ben Bakir et al. | |
| 2011/0142390 | A1 | * | 6/2011 | Feng | G02F 1/025 385/2 |
| 2011/0305416 | A1 | * | 12/2011 | Mekia | G02B 6/43 385/28 |
| 2012/0195544 | A1 | * | 8/2012 | Shen | G02F 2/00 385/3 |
| 2012/0243828 | A1 | * | 9/2012 | Suzuki | G02B 6/12007 385/32 |
| 2013/0330038 | A1 | * | 12/2013 | Onishi | G02B 6/262 385/31 |
| 2015/0241633 | A1 | | 8/2015 | Kusaka et al. | |

FOREIGN PATENT DOCUMENTS

| CN | 102654715 A | 9/2012 |
|---|---|---|
| CN | 103605216 A | 2/2014 |
| WO | 2014030575 A1 | 2/2014 |

OTHER PUBLICATIONS

Miyazaki, N., et al., "LiNbO3 Optical Intensity Modulator Packaged with Monitor Photodiode," IEEE Photonics Technology Letters, vol. 13, No. 5, May 2001, pp. 442-444.

Li, Y. et al., "Improved Multi-Mode Interferometers (MMIs) on Silicon-on-Insulator With the Optimized Return Loss and Isolation," Proceedings of the 2011 Annual Symposium of the IEEE Photonics Benelux Chapter, Dec. 2, 2011, pp. 205-208.

* cited by examiner

APPARATUS AND METHOD FOR AN OPTICAL SWITCH HAVING A 2×1 MULTI-MODE INTERFEROMETER AND PHOTODETECTOR

TECHNICAL FIELD

The present invention relates to optical switches, and, in particular embodiments, to an apparatus and method for 2×1 multi-mode interferometer (MMI) with integrated photodiode for off-state monitoring of 2×1 optical switch.

BACKGROUND

Silicon nanowire optical waveguides are used as a platform for photonic components in telecommunications, such as for coherent receivers. Large switch matrices are being considered as an application for this technology but several technical challenges remain in order to achieve a viable product. The challenges include the insertion loss, extinction ratio and closed-loop switch control. Further, germanium photodetectors in the silicon nanowire platform have reached a level of maturity enabling multi-project wafers. This development allows the integration of monitor photodiodes in switch matrices. A combination of a power tap in the output optical path, followed by a waveguide photodiode allows closed-loop operation of a switch cell. However power taps contribute to the insertion loss, which can add up to a significant amount with multiple switch stages. There is a need for an improved 2×1 MMI coupler with lower insertion loss.

SUMMARY OF THE INVENTION

In accordance with an embodiment, an optical switch comprises a 2×1 multi-mode interferometer (MMI) coupler including two input waveguides jointly coupled to an output waveguide, and a photodetector coupled to an edge of a first waveguide of the input waveguides, and positioned next to a side of the output waveguide.

In accordance with another embodiment, an optical chip comprises two input waveguides parallel to each other, and an output waveguide coupled to the two input waveguides. The optical chip further includes a photodetector coupled to a first waveguide of the two input waveguides, and positioned next to the output waveguide, and a branch waveguide extending from the first waveguide into the photodetector.

In accordance with yet another embodiment, a method for making an optical switch, the method includes forming, on a substrate using lithographic processes, a 2×1 MMI coupler including two input waveguides jointly coupled to an output waveguide, and forming a photodetector adjacent to an edge of a first waveguide of the input waveguides next to a side of the output waveguide.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
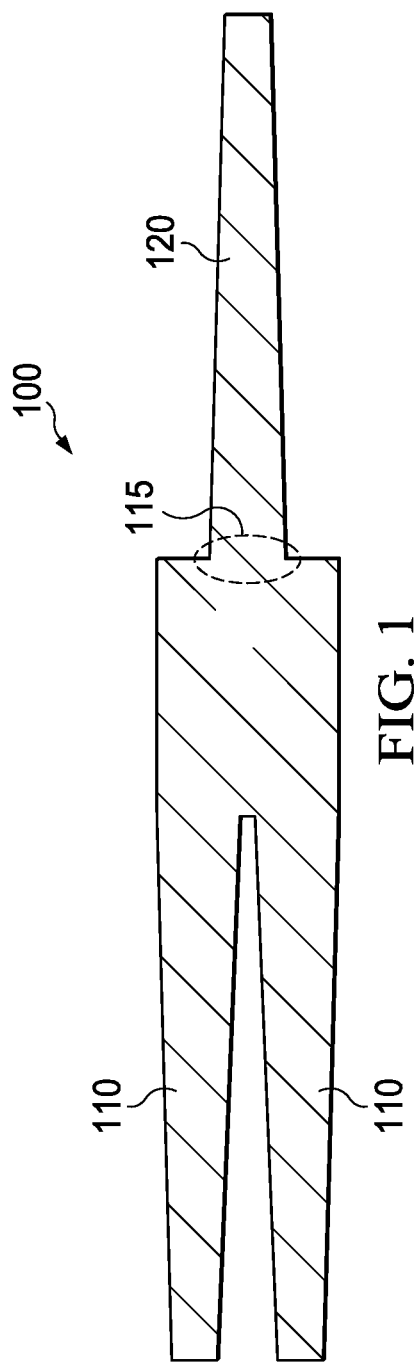
FIG. 1 shows a 2×1 MMI coupler.

FIG. 1 shows a design of a 2×1 switch 100 cell that can be used for switch devices. The 2×1 switch cell is also referred to herein as a 2×1 multi-mode interferometer (MMI) coupler. For example, the 2×1 MMI coupler 100 can be used in a switch topology designed to reduce crosstalk, also referred as "route and select" switch. This switch uses 1×2 switch cells in a first half of the switch (the "route" half) and 2×1 switch cells in a second half of the switch (the "select" half). The 2×1 MMI coupler 100 comprises two input waveguides 110 that combine into one output waveguide 120 at a junction 115, also referred to herein as a "box". In order to include optical detectors (or photodetectors) in a 2×1 MMI coupler 100, one previously used strategy is to couple a 2×2 cell to the input waveguides 110 of the 2×1 switch cell, and include a detector (e.g., a photodiode) in a "dump" port of the 2×1 MMI coupler 100 (e.g., tapped to the output waveguide 120). The 2×2 cell allows switching the optical signal to a "block" state, the other state being a "pass" or "through" state for the output light. Thus, a control loop can be established using a complementary optical signal. However due to their inherent asymmetry, 2×2 couplers are more difficult to design and fabricate than 2×1 couplers.

Figure 2:
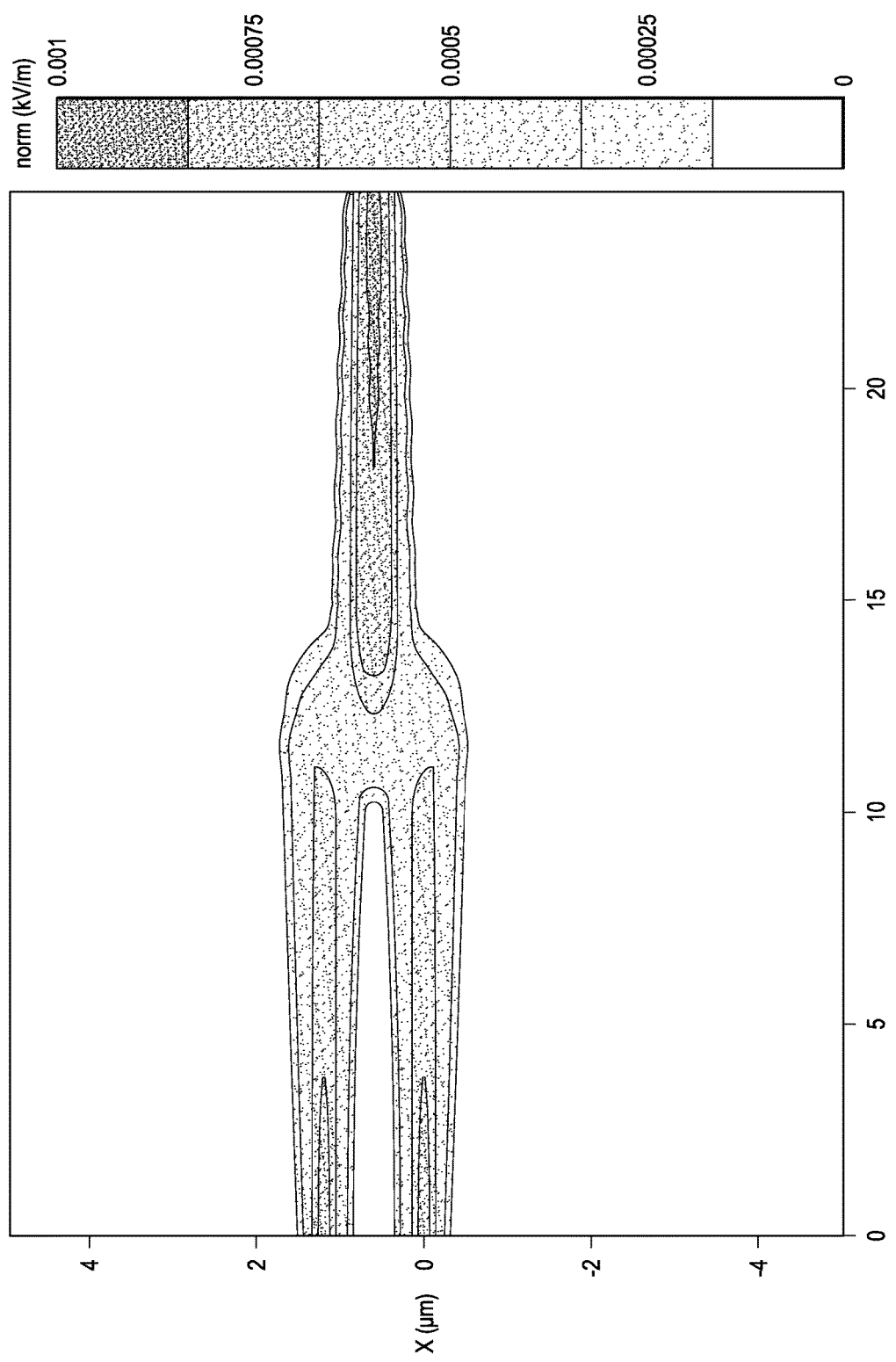
FIG. 2 shows a through state (inputs in phase) of the 2×1 MMI coupler of FIG. 1.
Figure 3:
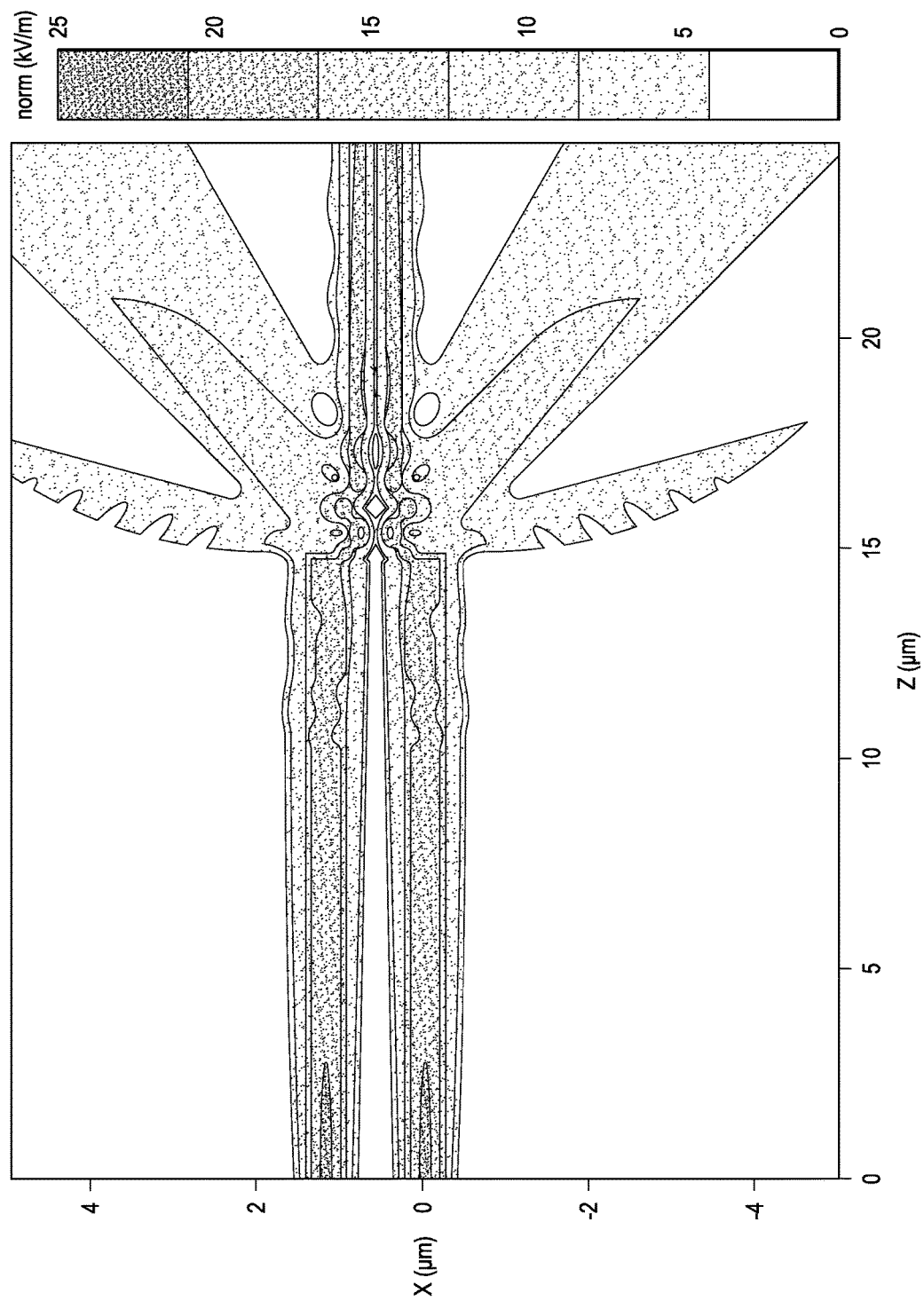
FIG. 3 shows a block state (inputs out of phase) of the 2×1 MMI coupler of FIG. 1.

FIG. 2 shows a through state of the 2×1 MMI coupler 100. In the through state, the light inputs in the corresponding input waveguides 110 of the coupler 200 are in phase. In this case, the inputs are efficiently combined in the output waveguide 120, without substantial loss of energy. FIG. 3 shows the block state (inputs out of phase) of the 2×1 MMI coupler 100, where the two light inputs are out of phase. In this case, there is significant light scattering at the junction or box 115. While some light passes through the output waveguide 120, there is significant light energy that scatters or radiates outside the coupler 100 on both sides from the box 115 as shown. Due to this scattering loss, the output light in the output waveguide 120 has substantially reduced energy. This affects the accuracy of detection of the block state when monitoring a fraction of the output light by tapping the output, as described above. The block state is also referred to herein as off-state.

Figure 4:
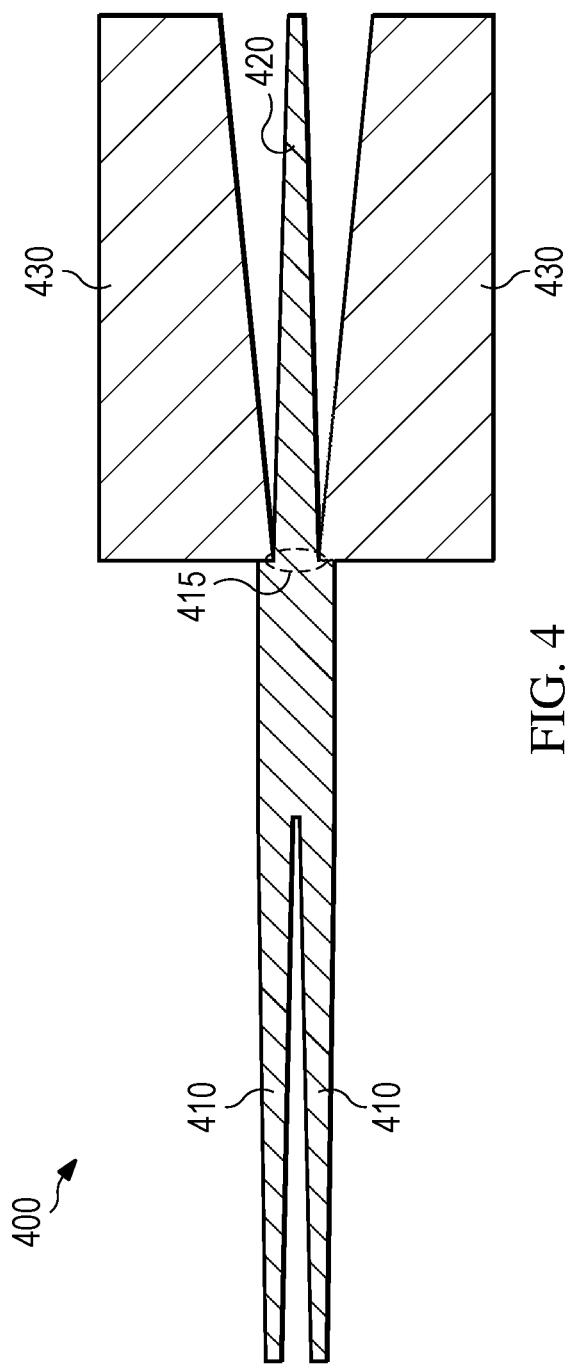
FIG. 4 shows an embodiment of an improved 2×1 MMI coupler with integrated detectors.

Embodiments are provided herein for an improved 2×1 switch cell design with integrated photodiode for off-state monitoring. The terms detector, photodetector, and photodiode are used herein interchangeably to refer to an integrated optical detector on a chip. FIG. 4 shows one embodiment of an improved 2×1 MMI coupler 400 with integrated detectors. The coupler 400 can be made of silicon and/or other suitable material, e.g. other semiconductor or dielectric materials, on a substrate. For example, using silicon on insulator (SOI) technology, the coupler can include a silicon core surrounded with side/top/bottom cladding of silicon dioxide on top of a silicon substrate or dielectric carrier. The design includes integrating one or two detectors 430 (e.g., germanium photodiodes) with the 2×1 MMI coupler 400.

In an embodiment, each detector 430 is extended from the end of the coupler junction or box 415 and along the length of and next to the output waveguide 420, as shown. In this case, the detector 430 is formed in the same plane as the coupler. The lateral dimension (with respect to light propagation direction) of the box 415 can be significantly wider than the lateral dimension of the output waveguide 420. The detector or detectors 430 are offset from the center of the box 415, where the output waveguide 420 is located. The absorbing detectors 430 can be carefully designed (e.g., by selecting dimensions and material) to reduce back-reflections (from the detectors 430) that would otherwise occur in the block state (the off-state). For instance, the detector 430 has a lateral dimension substantially greater than a lateral dimension of the interface between the respective input waveguide 410 and the detector 430, as shown. This can improve the coupling efficiency at the interface. Further, the side of the detector 430 facing a side of the output waveguide 420 is tapered to increase the separation between the two sides along the length of the output waveguide 420, as shown. This shape can prevent light propagating in the output waveguide 420 in the through state from leaking into the detector 430. Although two detectors 430 are shown on both sides of the box 415, in another embodiment, only one detector 430 can be used on one side of the box 415. However, the use of two detectors 430 can reduce loss and improve detection.

In another embodiment, the detector 430 are formed (e.g., as germanium structures) on top of a silicon extension layer in contact with the coupler junction or box 415. In this case, the detector 430 is formed above the plane of the coupler. As such, the detector 430 is a cladding on the silicon layer and serves to absorb the light in the silicon layer which is propagated from the respective input waveguides 110.

Figure 5:
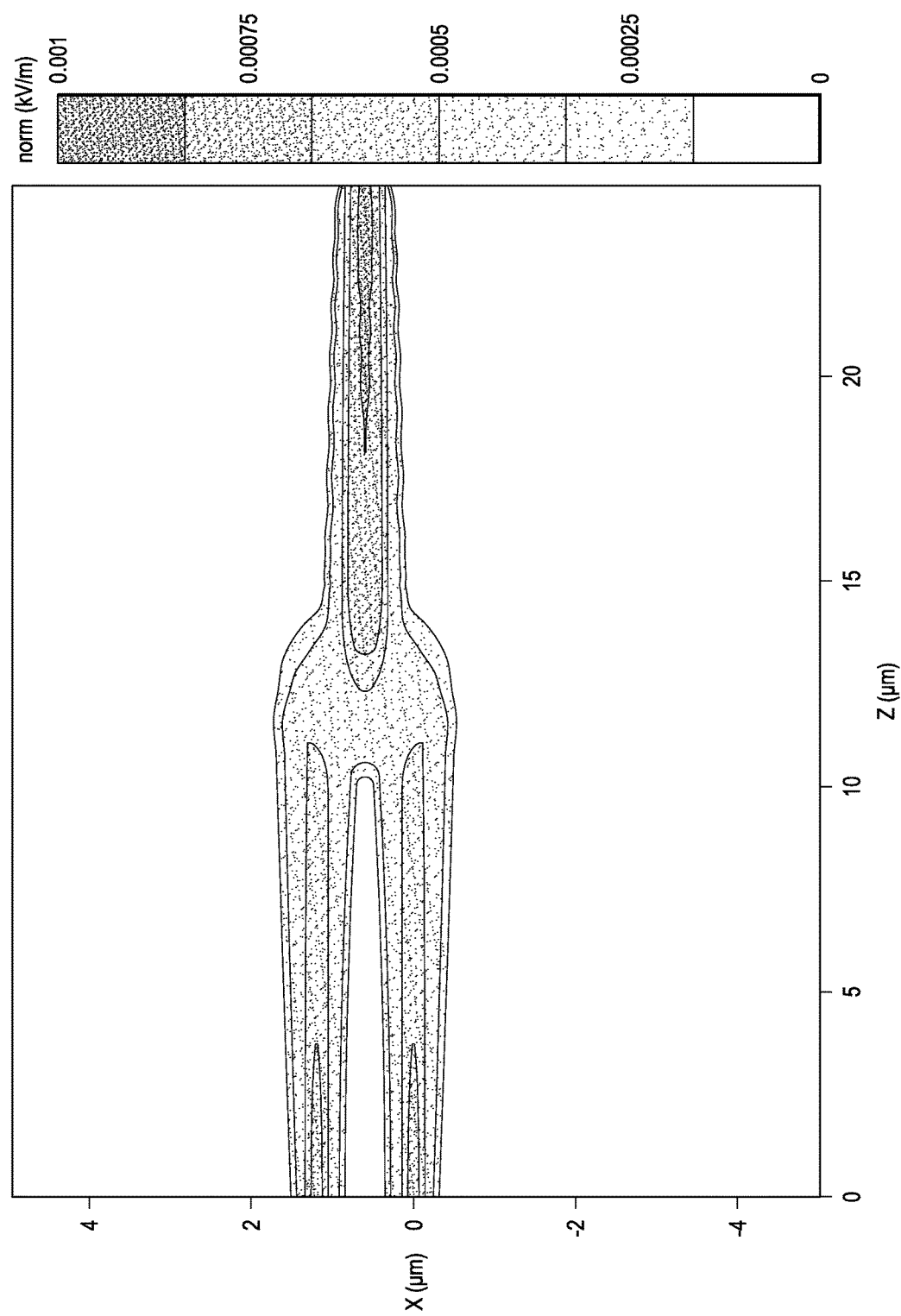
FIG. 5 shows a through state (inputs in phase) of the improved 2×1 MMI coupler of FIG. 4.
Figure 6:
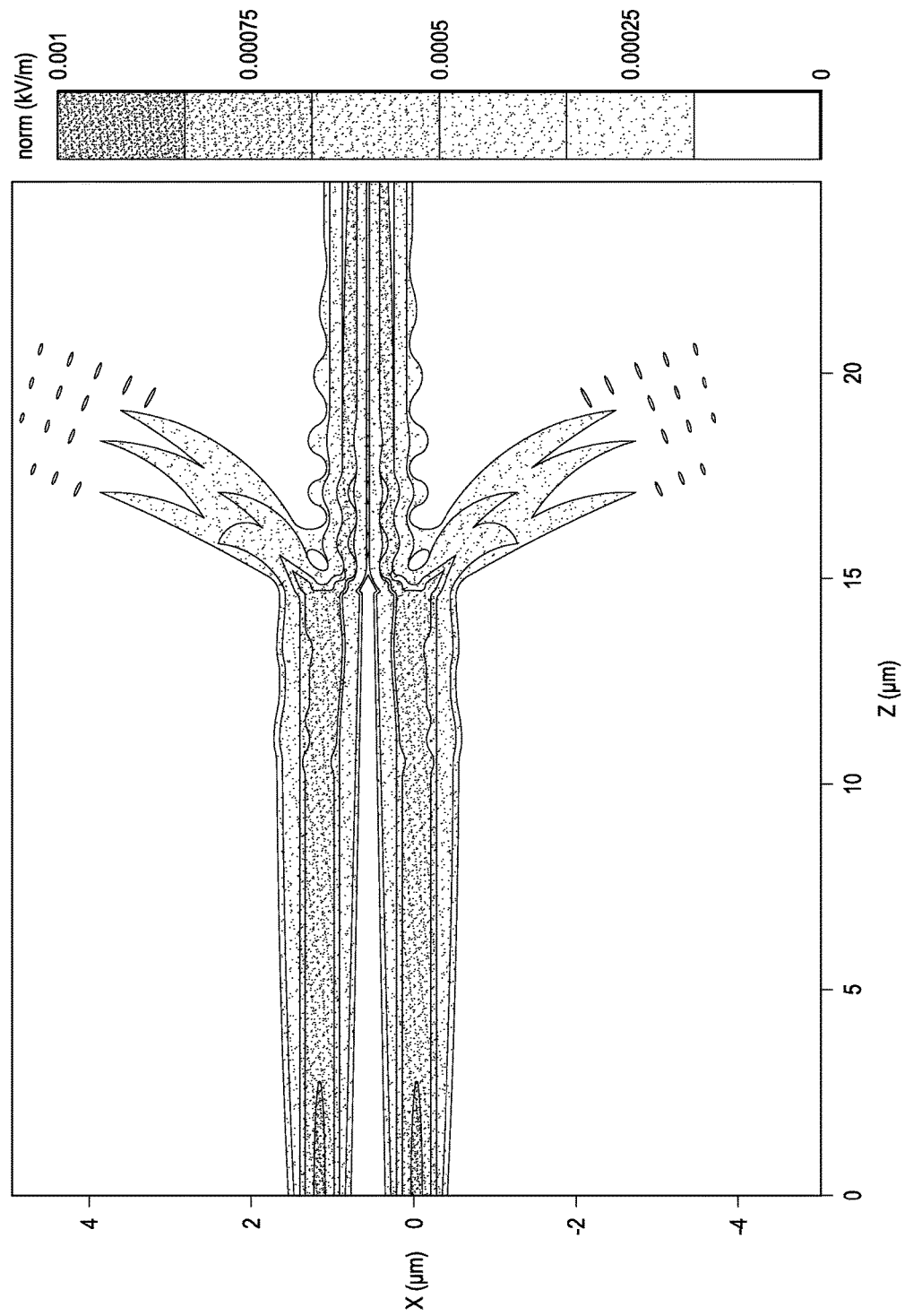
FIG. 6 shows a block state (inputs out of phase) of the improved 2×1 MMI coupler of FIG. 4.

FIG. 5 shows a through state of the improved 2×1 MMI coupler 400. In the through state, the light inputs in the corresponding input waveguides 410 of the coupler 400 are in phase. Given that the detectors 430 are designed carefully (to minimize back-reflections), the inputs are efficiently combined in the output waveguide 420, without substantial loss of energy. FIG. 6 shows the block state of the 2×1 MMI coupler 400, where the two light inputs are out of phase. In this case, the scattering light at the box 415 is absorbed in each detector 430 on the corresponding side of the box 415. Thus, the scattered light energy or a substantial portion of that energy is captured by the detector(s) 430. The detected light by the detector(s) 430 can be a significant portion of the total propagating light, and hence can provide efficient detection (in the off-state).

Figure 7:
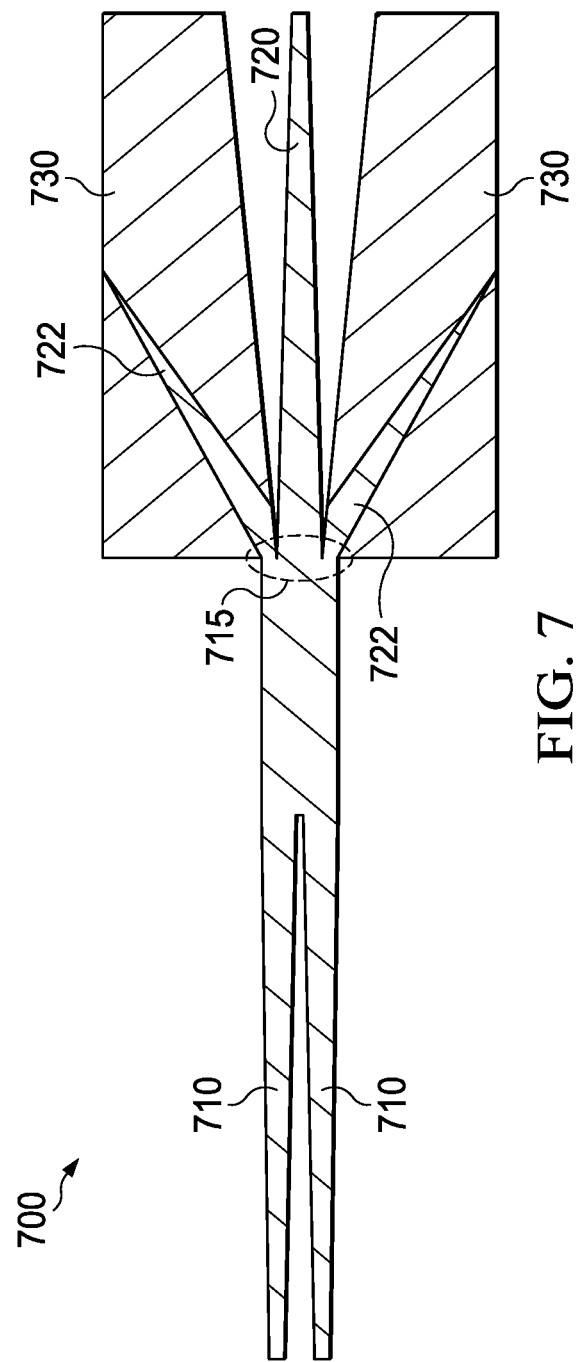
FIG. 7 shows another embodiment of an improved 2×1 MMI coupler with integrated detectors.

FIG. 7 shows another embodiment of an improved 2×1 MMI coupler 700 with integrated detectors. The design includes integrating one or two detectors 730 (e.g., germanium photodetectors) with the 2×1 MMI coupler 700, at the end of the coupler junction or box 715. The lateral dimension (with respect to light propagation direction) of the box 715 can be significantly wider than the lateral dimension of the output waveguide 720. The detector or detectors 730 are offset from the center of the box 715, where the output waveguide 720 is located. The design can be made such as the photodiode elements or detectors 430 exert a minimal perturbation to the transmission of light in the pass state. Specifically, a tapered waveguide component 722 is branched out from the box 715 inside each detector 730, at an angle from the output waveguide 720. The tapered geometry integrated inside the detector 730 provides a smooth coupling of the light from the box 715 and into the detector 730 by reducing back-reflection. The angle can be selected to improve the coupling efficiency from the respective input waveguide 710 to the detector 730. The different components of the 2×1 MMI coupler 700, including the detector(s) 730 and the branching tapered waveguide components 722, are fabricated and integrated in the same fabrication processes (e.g., lithographic processes) to obtain the final design of the coupler 700 on a single chip. Although two detectors 730 are shown on both sides of the box 715, in another embodiment, only one detector 730 can be used on one side of the box 715, or only one tapered waveguide component 722 can be integrated in one of two detectors 730. However, the use of two tapered waveguide component 722 into two detectors 730 can further reduce loss and improve detection.

Figure 8:
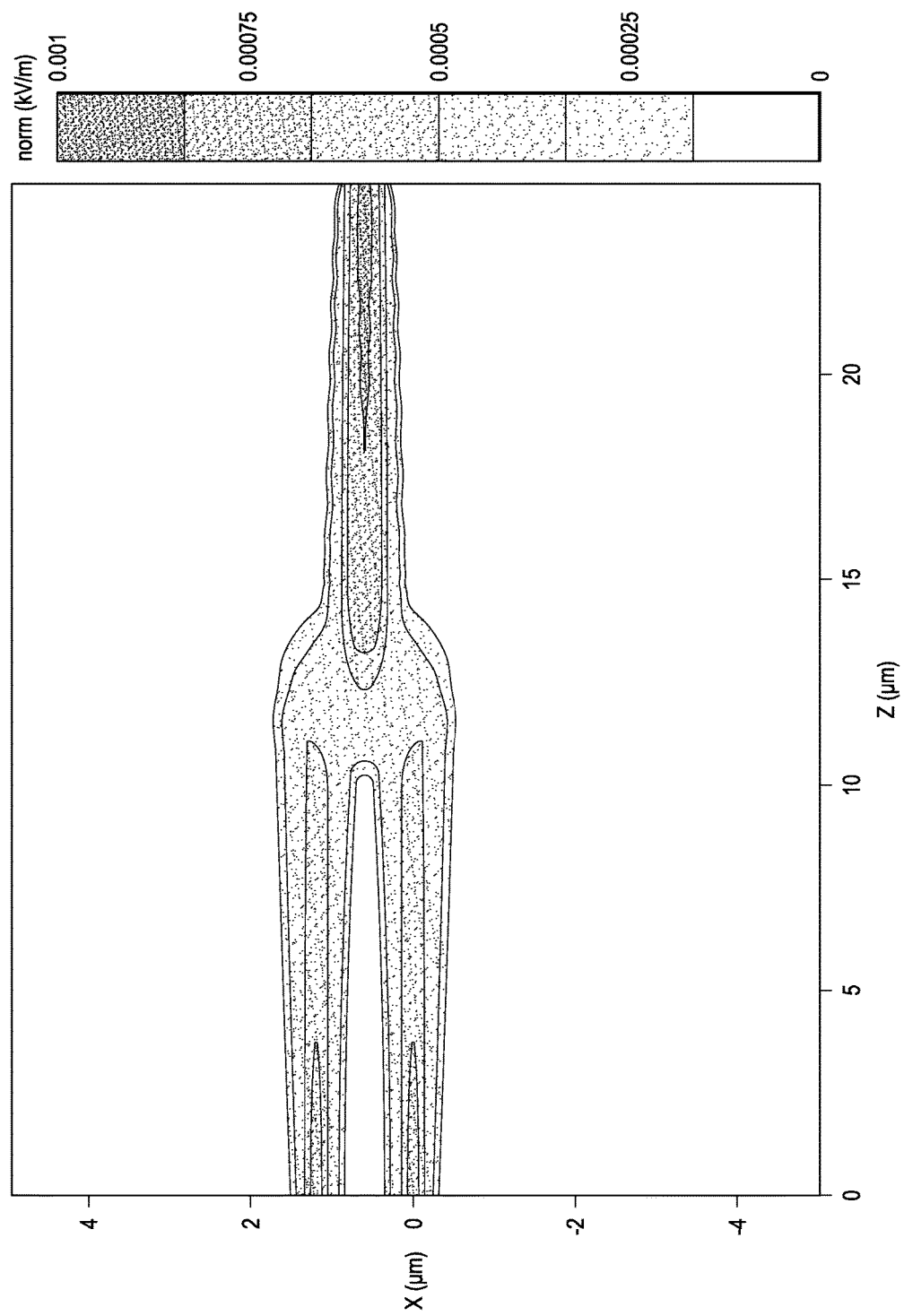
FIG. 8 shows a through state (inputs in phase) of the improved 2×1 MMI coupler of FIG. 7.
Figure 9:
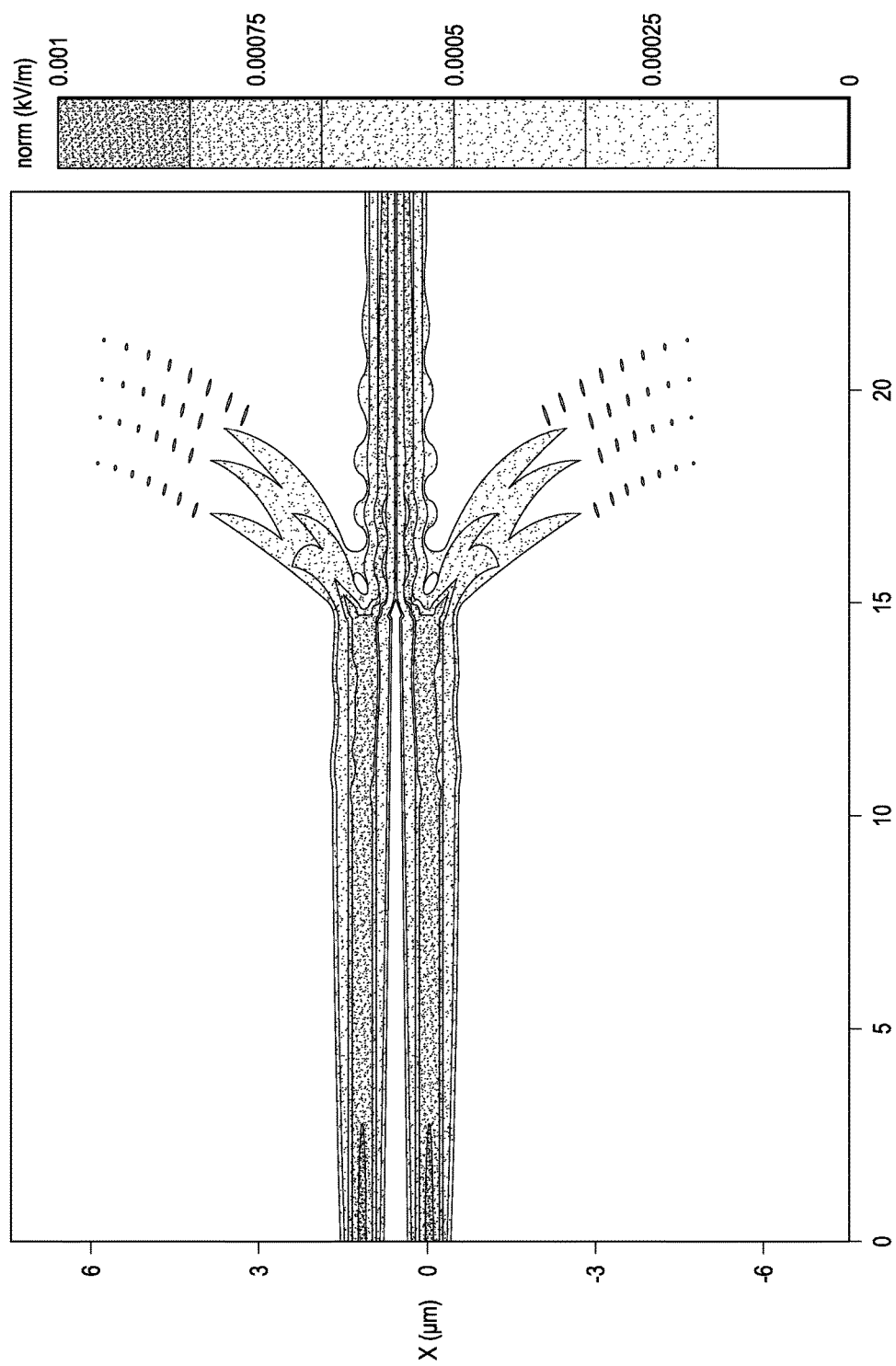
FIG. 9 shows a block state (inputs out of phase) of the improved 2×1 MMI coupler of FIG. 7.

FIG. 8 shows a through state of the improved 2×1 MMI coupler 700. In the through state, the light inputs in the corresponding input waveguides 710 of the coupler 700 are in phase. The inputs are efficiently combined in the output waveguide 420, without substantial loss of energy and without substantial leak into the tapered waveguide component(s) 722. FIG. 9 shows the block state of the 2×1 MMI coupler 700, where the two light inputs are out of phase. In this case, the light is propagated through the tapered waveguide components 722 in each detector 730 and absorbed in the respective detector 730. Thus, the light energy or a substantial portion of that energy is captured by the detector(s) 730. The detected light by the detector(s) 730 can be a significant portion of the total propagating light, and hence can provide efficient detection (in the off-state).

Compared to a 2×2 switch cell with a separate monitor diode in the unused output port, the 2×1 cell design in the embodiments above has better switching performance in terms of extinction ratio and insertion loss. Compared to a 2×1 switch cell followed by a power tap and photodiode, the design herein has better insertion loss, e.g., due to absence of a power tap. Another advantage of the design herein is that the scattered light in the block state is absorbed in the photodetector instead of radiated into the wafer plane, which reduces background noise otherwise generated in the block state. Further, the back-reflection in the block state can be diminished. Additionally, the integration of the photodetector with the coupler results in a more compact switch cell.

Figure 10:
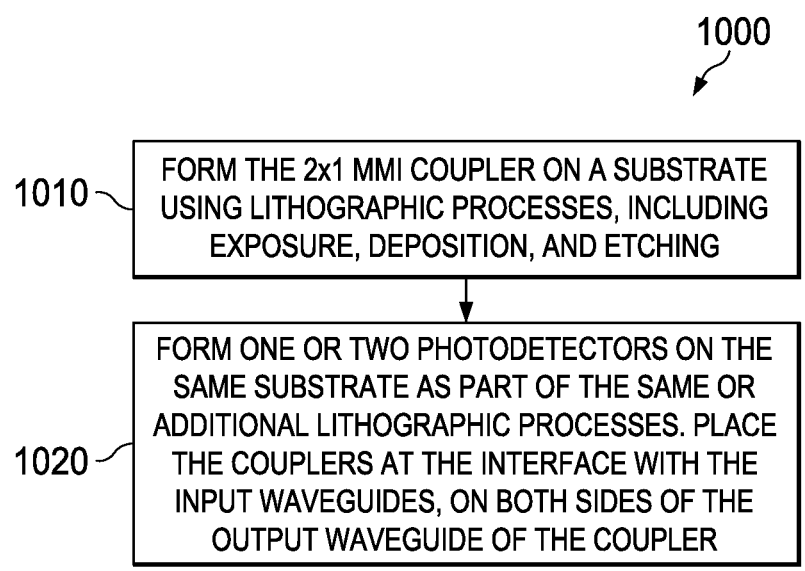
FIG. 10 is a flowchart of an embodiment method for making the improved 2×1 MMI coupler with integrated detectors.

FIG. 10 is a flowchart of an embodiment method 1000 for making the improved 2×1 MMI coupler with integrated detectors, such as the coupler 400 or 700. At step 1010, the 2×1 MMI coupler is formed on a substrate using lithographic processes, including exposure, deposition, and etching. At step 1020, one or two photodetectors are formed on the same substrate as part of the same or additional lithographic processes. The photodetectors can be formed as germanium waveguides adjacent to the coupler waveguides. Alternatively, each detector can be formed by growing germanium on top of a silicon layer in the same plane of the coupler. As such, the silicon layer serves as a waveguide for apportion of light from the coupler, and the germanium layer on top of the silicon layer serves as a cladding for this silicon layer. The germanium cladding absorbs the light from evanescent-wave coupling. The couplers are placed at the interface with the input waveguides, on both sides of the output waveguide of the coupler, e.g., as in the coupler 400. In an embodiment, a tapered waveguide component is branched out from at the interface with the two waveguides inside each detector, on the both sides of the output waveguide as in the coupler 700.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical switch comprising:
    a 2×1 multi-mode interferometer (MMI) coupler including two input waveguides jointly coupled to an output waveguide at a junction of the input waveguides and the output waveguide; and
    a first photodetector coupled to an edge of a first waveguide of the input waveguides at the junction of the input waveguides and the output waveguide, and extending along a side of the output waveguide.

2. The optical switch of claim 1 further comprising a second photodetector coupled to an edge of a second waveguide of the two input waveguides at the junction of the input waveguides and the output waveguide, and extending along a second side of the output waveguide opposite to the first photodetector.

3. The optical switch of claim 1, wherein the first photodetector is a germanium photodetector.

4. The optical switch of claim 1, wherein the optical switch does not comprise a power tap at the output waveguide.

5. The optical switch of claim 1, wherein the optical switch does not comprise another photodetector coupled to the output waveguide at the junction of the input waveguides and the output waveguide.

6. The optical switch of claim 1, wherein the first photodetector has a tapered side with an increasing separation from the output waveguide as the first photodetector extends along the side of the output waveguide.

7. The optical switch of claim 1, wherein the first photodetector has a lateral dimension substantially greater than a lateral dimension of the first waveguide and a lateral dimension of the output waveguide, and wherein the lateral dimension of the first photodetector has a length maximizing optical coupling efficiency from the first waveguide to the first photodetector in an off-state operation of the optical switch.

8. The optical switch of claim 1, wherein the first photodetector is in a same plane as the 2×1 MMI coupler.

9. The optical switch of claim 1, wherein the first photodetector is on top of a silicon layer that is in a same plane as the 2×1 MMI coupler.

10. A method for making an optical switch, the method comprising:
    forming, on a substrate using lithographic processes, a 2×1 multi-mode interferometer (MMI) coupler including two input waveguides jointly coupled to an output waveguide at a junction of the input waveguides and the output waveguide; and
    forming a first photodetector coupled to an edge of a first waveguide of the input waveguides at the junction of the input waveguides and the output waveguide, and extending along a side of the output waveguide.

11. The method of claim 10, further comprising forming a branch waveguide extending from the first waveguide at the junction into the first photodetector.

12. The method of claim 11, further comprising:
    forming a second photodetector coupled to an edge of a second waveguide of the two input waveguides at the junction of the input waveguides and the output waveguide, and extending along a second side of the output waveguide opposite to the first photodetector; and
    forming a second branch waveguide extending from the second waveguide at the junction into the second photodetector.

13. The method of claim 10, wherein the first photodetector is formed on the substrate using the lithographic processes.

14. The method of claim 10, wherein the forming the first photodetector includes growing a germanium layer on top of a silicon layer that is formed in a same plane as the 2×1 MMI coupler.

15. The method of claim 10, wherein forming the first photodetector comprises forming the first photodetector with a tapered side with an increasing separation from the output waveguide as the first photodetector extends along the side of the output waveguide.

16. The method of claim 10, wherein forming the first photodetector comprises forming the first photodetector with a lateral dimension substantially greater than a lateral dimension of the first waveguide and a lateral dimension of the output waveguide, and wherein the lateral dimension of the first photodetector has a length maximizing optical coupling efficiency from the first waveguide to the first photodetector in an off-state operation of the optical switch.

17. The method of claim 10, wherein forming the first photodetector comprises forming the first photodetector in a same plane as the 2×1 MMI coupler.

18. The method of claim 10, further comprising forming a second photodetector coupled to an edge of a second waveguide of the two input waveguides at the junction of the input waveguides and the output waveguide, and extending along a second side of the output waveguide opposite to the first photodetector.

19. The optical switch of claim 1, further comprising a branch waveguide extending from the first waveguide at the junction into the first photodetector.

20. The optical switch of claim 2, further comprising:
a first branch waveguide extending from the first waveguide at the junction into the first photodetector; and
a second branch waveguide extending from the second waveguide at the junction into the second photodetector.

* * * * *